(12) United States Patent
Ciarafoni et al.

(10) Patent No.: US 8,975,338 B2
(45) Date of Patent: Mar. 10, 2015

(54) PROPYLENE POLYMER COMPOSITIONS

(75) Inventors: Marco Ciarafoni, Ferrara (IT); Paola Massari, Ferrara (IT); Gisella Biondini, Portomaggiore (IT); Tiziana Caputo, Ferrara (IT); Monica Galvan, S. Maria Maddalena (IT)

(73) Assignee: Basell Poliolefine Italia S.r.l., Milan (IT)

( * ) Notice: Subject to any disclaimer, the term of this patent is extended or adjusted under 35 U.S.C. 154(b) by 722 days.

(21) Appl. No.: 13/264,966

(22) PCT Filed: Apr. 29, 2010

(86) PCT No.: PCT/EP2010/055788
§ 371 (c)(1),
(2), (4) Date: Nov. 10, 2011

(87) PCT Pub. No.: WO2010/133434
PCT Pub. Date: Nov. 25, 2010

(65) Prior Publication Data
US 2012/0059126 A1 Mar. 8, 2012

Related U.S. Application Data

(60) Provisional application No. 61/217,343, filed on May 29, 2009.

(30) Foreign Application Priority Data

May 21, 2009 (EP) ..................................... 09160867

(51) Int. Cl.
C08L 23/16 (2006.01)
C08F 297/08 (2006.01)
C08L 23/14 (2006.01)

(52) U.S. Cl.
CPC ........... *C08F 297/083* (2013.01); *C08L 23/142* (2013.01); *C08L 23/14* (2013.01); *C08L 2205/02* (2013.01)
USPC ........................................................ 525/240

(58) Field of Classification Search
CPC .... C08F 297/083; C08L 23/142; C08L 23/14
USPC ........................................................ 524/240
See application file for complete search history.

(56) References Cited

U.S. PATENT DOCUMENTS

| | | | |
|---|---|---|---|
| 4,399,054 A | 8/1983 | Ferraris | |
| 4,469,648 A | 9/1984 | Ferraris | |
| 6,413,477 B1 | 7/2002 | Govoni et al. | |
| 6,423,782 B1 | 7/2002 | Yukimasa et al. | |
| 6,455,643 B1 | 9/2002 | Harlin et al. | |
| 6,743,864 B2 | 6/2004 | Glogovsky et al. | |
| 2004/0014896 A1 | 1/2004 | Datta et al. | |
| 2006/0047071 A1* | 3/2006 | Pelliconi et al. | ............... 525/191 |
| 2006/0235159 A1 | 10/2006 | Datta et al. | |

FOREIGN PATENT DOCUMENTS

| | | |
|---|---|---|
| CN | 101163727 | 4/2008 |
| EP | 45977 | 2/1982 |
| EP | 036194 | 4/1990 |
| EP | 0597461 | 5/1994 |
| EP | 728769 | 8/1996 |
| EP | 782587 | 7/1997 |
| EP | 0395083 | 11/1997 |
| EP | 1272533 | 9/2008 |
| JP | H08-012826 | 1/1996 |
| JP | H09-239925 | 9/1997 |
| JP | 2000-313777 | 11/2000 |
| JP | 2002-504953 | 2/2002 |
| JP | 2005-520012 | 7/2005 |
| WO | WO-9844001 | 10/1998 |
| WO | WO-9859002 | 12/1998 |
| WO | WO-0002929 | 1/2000 |
| WO | WO-0063261 | 10/2000 |
| WO | WO-01/92406 | 12/2001 |
| WO | WO-02051912 | 7/2002 |
| WO | WO-03046021 | 6/2003 |
| WO | WO-03051984 | 6/2003 |
| WO | WO2006046021 | 5/2006 |
| WO | WO-2006/082144 | 8/2006 |
| WO | WO-2006114357 | 11/2006 |
| WO | WO-2006120190 | 11/2006 |
| WO | WO-2008012144 | 1/2008 |
| WO | WO-2010133438 | 11/2010 |

\* cited by examiner

Primary Examiner — Doris Lee

(57) ABSTRACT

A propylene composition comprising (percent by weight):
A) 60%-90%, of a crystalline propylene copolymer containing from 3.5% to 10% of ethylene derived units;
B) 10%-40%, of a copolymer of propylene containing from 18.5% to 23.5%, of ethylene derived units.

6 Claims, No Drawings

PROPYLENE POLYMER COMPOSITIONS

This application is the U.S. national phase of International Application PCT/EP2010/055788, filed Apr. 29, 2010, claiming priority to European Application 09160867.9 filed May 21, 2009 and the benefit under 35 U.S.C. 119(e) of U.S. Provisional Application No. 61/217,343, filed May 29, 2009; the disclosures of International Application PCT/EP2010/055788, European Application 09160867.9 and U.S. Provisional Application No. 61/217,343, each as filed, are incorporated herein by reference.

The present invention relates to a propylene polymer composition having an optimum balance of properties in particular improved impact strength and excellent optical properties.

As is known, the isotactic polypropylene is endowed with an exceptional combination of excellent properties which render it suitable for a very great number of uses. In order to improve said properties into the propylene stereoregular homopolymerization process have been introduced one or more copolymerization steps or one or more monomer have been introduced in the homopolymer matrix.

WO 01/92406 relates to a propylene polymer compositions comprising:
A) from 70 to 90%, preferably from 75 to 85%, of a random copolymer of propylene with ethylene, containing from 1 to 6%, preferably from 1.5 to 4%, of ethylene and
B) from 10% to 30%, preferably from 15% to 25%, of a copolymer of propylene with ethylene, containing from 8 to 18%, preferably from 10 to 18%, of ethylene.

Said composition is said to have an optimum balance of transparency, stiffness and impact resistance even at low temperatures.

WO 2006/082144 relates to a propylene polymer composition comprising:
(A) 75-95% by weight of a copolymer of propylene comprising from 0.5 (0.3% wt) to 3.0 mole % 2% wt), of comonomer units derived from ethylene; and
(B) 5-25% by weight of a copolymer of propylene comprising from 25 (18% wt) to 45 mole % (35% wt), of ethylene units.

Said composition is said to have a good balance of flexibility and impact properties.

WO 03/051984 relates to a polyolefin composition comprising (percent by weight):
1) 55%-90%, preferably 62%-85%, of a crystalline propylene homopolymer or copolymer containing up to 15%, preferably up to 10%, of ethylene and/or $C_4$-$C_{10}$ alpha olefin; and
2) 10%-45%, preferably 15%-40%, of a blend of a copolymer of propylene with more than 15% up to 40% of ethylene, preferably from 18% to 35% of ethylene (copolymer (a)), and a copolymer of ethylene with one or more $C_4$-$C_{10}$ alpha-olefin(s) containing from 10% to 40%, preferably from 10% to 35%, of said $C_4$-$C_{10}$ alpha-olefin(s) (copolymer (b)).

WO 03/046021 relates to a propylene polymer composition, comprising:
A) from 50 to 90% of one or more propylene copolymer(s) selected from the group consisting of (A1) random copolymers of propylene with ethylene containing from 1 to 7%, of ethylene; (A2) copolymers of propylene with one or more $C_4$-$C_8$ alpha-olefins containing 2-10% of the $C_4$-$C_8$ alpha-olefin(s); (A3) copolymers of propylene with ethylene and one or more $C_4$-$C_8$ alpha-olefin(s) containing 0.5-5% of ethylene and 2-6% of $C_4$-$C_8$ a-olefins; and
B) from 10 to 50% of a copolymer of propylene containing from 8 to 40% of ethylene and optionally 1-10% of a $C_4$-$C_8$ a-olefins;

The applicant found that it is possible to achieve improved properties in term of softness and clarity by using a particular class of propylene composition.

The object of the present invention is a propylene composition comprising (percent by weight):
A) 60%-90%, preferably 70%-90%, more preferably 75%-88%, even more preferably 80%-88%, of a crystalline propylene copolymer containing from 3.5% to 10.0% preferably from 3.5% to 9.0% more preferably from 4.0% to 6.5% even more preferably from 4.0% to 5.5% of ethylene derived units;
B) 10%-40%, preferably 10%-30%, more preferably 12%-25% even more preferably 12%-20% of a copolymer of propylene with from 18.5% to 23.5%, preferably from 18.5% to 22.0%; even more preferably from 19.0% to 21.0% of ethylene derived units.

From the above definitions it is evident that the term "copolymer" includes polymers containing only two kinds of comonomers.

Other preferred features for the compositions of the present invention are:
MFR L (Melt Flow Rate according to ISO 1133, condition L, i.e. 230° C. and 2.16 kg load) from 0.5 to 50 g/10 min, in particular from 3 to 20 g/10 min.; more preferably from 4 to 20 g/10 min.
Intrinsic Viscosity [I.V.] of the fraction (of the overall composition) soluble in xylene at room temperature: from 1 to 4.5, preferably from 1.1. to 3 dl/g; more preferably from 1.1. to 2 dl/g; even more preferably from 1.1 to 1.6 dl/g.

The compositions of the present invention present at least one melt peak, determined by way of DSC (Differential Scanning calorimetry), at a temperature ranging from 130-150° C. preferably from 135-145° C.

Moreover, the compositions of the present invention preferably are endowed with some or all these properties:
a Flexural Modulus is comprised between 700 MPa and 500 MPa;
Haze measured on 1 mm plaques lower than 25%; preferably lower than 23%;
Izod impact strength measured at 23° C. and Melt Flow Rate (MFR) fulfilling the following relationship:
MFR*Iz23>MFR*15+85; preferably MFR*Iz23>MFR*20+85, more preferably MFR*Iz23>MFR*25+85

Wherein Iz23 is the Izod impact strength measured at 23° C. and MFR is the Melt Flow Rate according to ISO 1133, condition L, i.e. 230° C. and 2.16.

The propylene polymer compositions of the present invention can be prepared by sequential polymerization in at least two stages, with each subsequent polymerization stage being conducted in the presence of the polymeric material formed in the immediately preceding polymerization reaction, wherein the copolymer (A) is normally prepared in at least one first polymerization stage and the copolymer (B) is normally prepared in at least one second polymerization stage.

Preferably, each polymerization stage is carried out in presence of a highly stereospecific heterogeneous Ziegler-Natta catalyst. The Ziegler-Natta catalysts suitable for producing the propylene polymer compositions of the invention comprise a solid catalyst component comprising at least one titanium compound having at least one titanium-halogen bond and at least an electron-donor compound (internal donor), both supported on magnesium chloride. The Ziegler-Natta catalysts systems further comprise an organo-aluminum compound as essential co-catalyst and optionally an external electron-donor compound.

Suitable catalysts systems are described in the European patents EP45977, EP361494, EP728769, EP 1272533 and in the international patent application WO00163261.

Preferably, the solid catalyst component comprises Mg, Ti, halogen and an electron donor selected from succinates of formula (I):

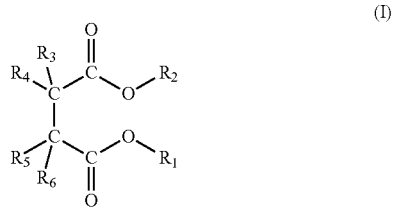

(I)

wherein the radicals $R^1$ and $R^2$, equal to or different from each other, are a $C_1$-$C_{20}$ linear or branched alkyl, alkenyl, cycloalkyl, aryl, arylalkyl or alkylaryl group, optionally containing heteroatoms belonging to groups 15-17 of the periodic table; the radicals $R^3$ to $R^6$ equal to or different from each other, are hydrogen or a $C_1$-$C_2$ linear or branched alkyl, alkenyl, cycloalkyl, aryl, arylalkyl or alkylaryl group, optionally containing heteroatoms, and the radicals $R^3$ to $R^6$ which are joined to the same carbon atom can be linked together to form a cycle.

$R^1$ and $R^2$ are preferably $C_1$-$C_8$ alkyl, cycloalkyl, aryl, arylalkyl and alkylaryl groups.

Particularly preferred are the compounds in which $R^1$ and $R^2$ are selected from primary alkyls and in particular branched primary alkyls. Examples of suitable $R^1$ and $R^2$ groups are methyl, ethyl, n-propyl, n-butyl, isobutyl, neopentyl, 2-ethylhexyl. Particularly preferred are ethyl, isobutyl, and neopentyl.

One of the preferred groups of compounds described by the formula (I) is that in which $R^3$ to $R^5$ are hydrogen and $R^6$ is a branched alkyl, cycloalkyl, aryl, arylalkyl and alkylaryl radical having from 3 to 10 carbon atoms. Another preferred group of compounds within those of formula (I) is that in which at least two radicals from $R^3$ to $R^6$ are different from hydrogen and are selected from $C_1$-$C_{20}$ linear or branched alkyl, alkenyl, cycloalkyl, aryl, arylalkyl or alkylaryl group, optionally containing heteroatoms belonging to groups.

Particularly preferred are the compounds in which the two radicals different from hydrogen are linked to the same carbon atom. Furthermore, also the compounds in which at least two radicals different from hydrogen are linked to different carbon atoms, that is $R^3$ and $R^5$ or $R^4$ and $R^6$ are particularly preferred.

According to a preferred method, the solid catalyst component can be prepared by reacting a titanium compound of formula $Ti(OR)_{n-y}X_y$ where n is the valence of titanium and y is a number between 1 and n, preferably TiCl4, with a magnesium chloride deriving from an adduct of formula $MgCl_2 \cdot pROH$, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermal controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold $TiCl_4$ (generally 0° C.); the mixture is heated up to 80-130° C. and kept at this temperature for 0.5-2 hours. The treatment with TiCl4 can be carried out one or more times. The internal donor can be added during the treatment with $TiCl_4$ and the treatment with the electron donor compound can be repeated one or more times. Generally, the succinate of formula (I) is used in molar ratio with respect to the MgCl2 of from 0.01 to 1 preferably from 0.05 to 0.5. The preparation of catalyst components in spherical form is described for example in European patent application EP-A-395083 and in the International patent application WO98144001. The solid catalyst components obtained according to the above method show a surface area (by B.E.T. method) generally between 20 and 500 m$^2$/g and preferably between 50 and 400 m$^2$/g, and a total porosity (by B.E.T. method) higher than 0.2 cm$^3$/g preferably between 0.2 and 0.6 cm$^3$/g. The porosity (Hg method) due to pores with radius up to 10,000 A generally ranges from 0.3 to 1.5 cm$^3$/g, preferably from 0.45 to 1 cm$^3$/g.

The organo-aluminum compound is preferably an alkyl-Al selected from the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as $AlEt_2Cl$ and $Al_2Et_3Cl_3$.

Preferred external electron-donor compounds include silicon compounds, ethers, esters such as ethyl 4-ethoxybenzoate, amines, heterocyclic compounds and particularly 2,2,6,6-tetramethyl piperidine, ketones and the 1,3-diethers. Another class of preferred external donor compounds is that of silicon compounds of formula $R_a^5 R_b^6 Si(OR^7)_c$ where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. Particularly preferred are methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1, trifluoropropyl-2-ethylpiperidinyl-dimethoxysilane and 1,1,1, trifluoropropyl-metildimethoxysilane. The external electron donor compound is used in such an amount to give a molar ratio between the organo-aluminum compound and said electron donor compound of from 0.1 to 500.

The polymerization process can be carried out in gas phase and/or in liquid phase, in continuous or batch reactors, such as fluidized bed or slurry reactors. For example, it is possible to carry out the polymerization of the propylene polymer (A) in liquid phase, using liquid propylene as diluent, while the copolymerization stage to obtain the propylene copolymer fraction (B) is carried out in gas phase, without intermediate stages except for the partial degassing of the monomers. Alternatively, all the sequential polymerization stages can be carried out in gas phase. The reaction time, temperature and pressure of the polymerization steps are not critical, however the temperature for the preparation of fraction (A) and (B), that can be the same or different, is usually from 50° C. to 120° C. The polymerization pressure preferably ranges from 0.5 to 12 MPa if the polymerization is carried out in gasphase. The catalytic system can be pre-contacted (pre-polymerized) with small amounts of olefins. The molecular weight of the propylene polymer composition is regulated by using known regulators, such as hydrogen.

According to a preferred embodiment, the propylene polymer (A) is produced by a gas-phase polymerization process carried out in at least two interconnected polymerization zones. Said polymerization process is described in the European patent EP 782587.

The process is carried out in a first and in a second interconnected polymerization zone to which propylene and ethylene or propylene and alpha-olefins are fed in the presence of a catalyst system and from which the polymer produced is discharged. The growing polymer particles flow through the first of said polymerization zones (riser) under fast fluidization conditions, leave said first polymerization zone and enter the second of said polymerization zones (downcomer) through which they flow in a densified form under the action of gravity, leave said second polymerization zone and are reintroduced into said first polymerization zone, thus establishing a circulation of polymer between the two polymerization zones. Generally, the conditions of fast fluidization in the first polymerization zone is established by feeding the monomers gas mixture below the point of reintroduction of the growing polymer into said first polymerization zone. The velocity of the transport gas into the first polymerization zone is higher than the transport velocity under the operating conditions and is normally between 2 and 15 m/s. In the second polymerization zone, where the polymer flows in densified form under the action of gravity, high values of density of the solid are reached which approach the bulk density of the polymer; a positive gain in pressure can thus be obtained along the direction of flow, so that it becomes possible to reintroduce the polymer into the first reaction zone without the help of mechanical means. In this way, a "loop" circulation is set up, which is defined by the balance of pressures between the two polymerization zones and by the head loss introduced into the system. Optionally, one or more inert gases, such as nitrogen or an aliphatic hydrocarbon, are maintained in the polymerization zones, in such quantities that the sum of the partial pressures of the inert gases is preferably between 5 and 80% of the total pressure of the gases. The operating parameters such as, for example, the temperature are those that are usual in gas-phase olefin polymerization processes, for example between 50° C. and 120° C. The process can be carried out under operating pressure of between 0.5 and 10 MPa, preferably between 1.5 and 6 MPa. Preferably, the various catalyst components are fed to the first polymerization zone, at any point of said first polymerization zone. However, they can also be fed at any point of the second polymerization zone. Molecular weight regulators known in the art, particularly hydrogen, can be used to regulate the molecular weight of the growing polymer.

In the second stage of the particularly preferred polymerization process, the propylene/ethylene copolymer (B) is produced in a conventional fluidized-bed gas-phase reactor in the presence of the polymeric material and the catalyst system coming from the preceding polymerization step. The polymerization mixture is discharged from the downcomer to a gas-solid separator, and subsequently fed to the fluidized-bed gas-phase reactor operating under conventional conditions of temperature and pressure.

The propylene polymer compositions of the present invention can also be obtained by separately preparing the said copolymers (A) and (B), operating with the same catalysts and substantially under the same polymerization conditions as previously illustrated and subsequently mechanically blending said copolymers in the molten state using conventional mixing apparatuses, like twin-screw extruders.

The propylene polymer compositions of the present invention may further comprise additives commonly employed in the polyolefin field, such as antioxidants, light stabilizers, nucleating agents, antacids, colorants and fillers.

The main application of the propylene polymer compositions of the invention is the production of molded articles, particularly injection-molded items. The injection-molded articles comprising the propylene polymer compositions of the invention have good flexibility and good impact properties and are also endowed with good transparency.

The following examples are given to illustrate and not to limit the present invention.

EXAMPLES

The Data of the Propylene Polymer Materials were Obtained According to the Following Methods:
Xylene-Soluble Faction 2.5 g of polymer and 250 mL of o-xylene are introduced in a glass flask equipped with a refrigerator and a magnetical stirrer. The temperature is raised in 30 minutes up to the boiling pint of the solvent. The so obtained solution is then kept under reflux and stirring for further 30 minutes. The closed flask is then kept for 30 minutes in a bath of ice and water and in thermostatic water bath at 25° C. for 30 minutes as well. The solid thus obtained is filtered on quick filtering paper and the filtered liquid is divided into two 100 ml aliquots. One 100 ml aliquots of the filtered liquid is poured in a previously weighed aluminum container, which is heated on a heating plate under nitrogen flow, to remove the solvent by evaporation. The container is then kept on an oven at 80° C. under vacuum until constant weight is obtained. The residue is weighed to determine the percentage of xylene-soluble polymer.

Ethylene (C2) Content
By IR spectroscopy.

The comonomer content of the Component B is determined on the precipitated "amorphous" fraction of the polymer. The precipitated "amorphous" fraction is obtained as follows: to one 100 ml aliquot of the filtered liquid obtained as described above (procedure for the Xylene-soluble faction) 200 ml of acetone are added under vigorous stirring. Precipitation must be complete as evidenced by a clear solid-solution separation. The solid thus obtained is filtered on a tared metallic screen and dried in a vacuum oven at 70° C. until a constant weight is reached.

Molar Ratio of Feed Gasses
  Determined by Gas-Chromatography
Melt Flow Rate (MFR)
  Determined according to ISO 1133 (230° C., 2.16 Kg)
Intrinsic Viscosity
  Determined in tetrahydronaphthalene at 135° C.
Flexural Modulus
  Determined according to ISO 178
Stress at Yield and at Break
  Determined according to ISO 527
Elongation at Yield and Break
  Determined according to ISO 527
IZOD Impact Strength
  Determined according to ISO 18011A
Ductile/Brittle Transition Temperature (D/B)

According to this method, the bi-axial impact resistance is determined through impact with an automatic, computerized striking hammer.

The circular test specimens are obtained by cutting with circular hand punch (38 mm diameter). They are conditioned for at least 12 hours at 23° C. and 50 RH and then placed in a thermostatic bath at testing temperature for 1 hour. The force-time curve is detected during impact of a striking hammer (5.3 kg, hemispheric punch with a ½ diameter) on a circular specimen resting on a ring support. The machine used is a CEAST 67581000 type model no. 2.

D/B transition temperature is the temperature at which 50% of the samples undergoes fragile break when submitted to the above-mentioned impact test. The plaques for D/B measurements, having dimensions of 127×127×1.5 mm are prepared according to the following method.

The injection press is a Negri Bossi™ type (NB 90) with a clamping force of 90 tons. The mould is a rectangular plaque (127×127×1.5 mm).

The main process parameters are reported below:
Back pressure (bar): 20
Injection time (s): 3
Maximum Injection pressure (MPa): 14
Hydraulic injection pressure (MPa): 6-3
First holding hydraulic pressure (MPa): 4±2
First holding time (s): 3
Second holding hydraulic pressure (MPa): 3±2
Second holding time (s): 7
Cooling time (s): 20
Mould temperature (° C.): 60
The melt temperature is between 220 and 280° C.
Haze (on 1 mm Plaque)

According to the method used, 5×5 cm specimens are cut molded plaques of 1 mm thick and the haze value is measured using a Gardner photometric unit connected to a Hazemeter type UX-10 or an equivalent instrument having G.E. 1209 light source with filter "C". Reference samples of known haze are used for calibrating the instrument. The plaques to be tested are produced according to the following method.

75×75×1 mm plaques are molded with a GBF Plastiniector G235190 Injection Molding Machine, 90 tons under the following processing conditions:
Screw rotation speed: 120 rpm
Back pressure: 10 bar
Melt temperature: 260° C.
Injection time: 5 sec
Switch to hold pressure: 50 bar
First stage hold pressure: 30 bar
Second stage pressure: 20 bar
Hold pressure profile: First stage 5 sec
Second stage 10 sec
Cooling time: 20 sec
Mold water temperature: 40° C.
Melting Temperature, Melting Enthalpy and Crystallization Temperature Determined by DSC with a temperature variation of 20° C. per minute

Examples 1-2

The Ziegler-Natta catalyst was prepared according to the Example 5, lines 48-55 of the European Patent EP728769. Triethylaluminium (TEAL) was used as co-catalyst and dicyclopentyldimethoxysilane as external donor.

The propylene polymer compositions of the examples were prepared in a two-step polymerization process, wherein the copolymer (A) was prepared in the first polymerization step by feeding the monomers and the catalyst system to a gas-phase polymerization reactor comprising two interconnected polymerization zones, a riser and a downcomer, as described in the European Patent EP782587 (reactor MZCR). The polymerization mixture was discharged from said reactor, conveyed to a gas-solid separator and the polymerized material was sent into a conventional gas-phase fluidized-bed reactor where the propyleneethylehe copolymer (B) was produced. The operative conditions are indicated in Table 1.

The polymer particles exiting from the second polymerization step were subjected to a steam treatment to remove the unreacted monomers and dried.

The propylene polymer compositions were added with the following additives Calcium stearate 500 ppm, GMS90 500 ppm, Irganox B215 1500 ppm, Millad 3988 1800 ppm—and extruded in a twin-screw extruder Berstorff (L/D=33) under the following operating conditions:
Temperature of the feeding section: 190-210° C.
Melt temperature: 240° C.
Temperature of the die section: 230° C.
Flow rate: 16 Kg/h
Rotational speed: 250 rpm

TABLE 1

| Example | | | 1 | 2 |
|---|---|---|---|---|
| Component A) (reactor MZCR | | | | |
| TEAL/external donor | | wt/wt | 4 | 4 |
| TEAL/catalyst | | wt/wt | 5 | 5 |
| Temperature | | ° C. | 72 | 72 |
| Pressure | | bar-g | 27 | 27 |
| Split holdup | riser | wt % | 45 | 40 |
|  | downcomer | wt % | 55 | 60 |
| $C_3^-$ riser | | mole % | 79 | 75 |
| $C_2^-$ riser | | mole % | 2.8 | 3.1 |
| $H_2/C_3^-$ riser | | mol/mol | 0.021 | 0.09 |
| $C_2^-/(C_2^- + C_3^-)$ | | mol/mol | 0.035 | 0.041 |
| MFR | | g/10 min | 5 | 21 |
| $C_2^-$ total content | | wt % | 4.6 | 4.7 |
| XS | | wt % | 8.8 | 8.9 |
| Tm | | ° C. | | 137.5 |
| Component B (gas phase reactor) | | | | |
| Temperature | | ° C. | 75 | 75 |
| Pressure | | MPa | 1.7 | 1.7 |
| Split * | | % | 20 | 16 |
| $C_2^-/C_2^- + C_3^-$ | | mol/mol | 0.19 | 0.2 |
| $H_2/C_2^-$ | | mol/mol | 0.47 | 0.47 |

* Amount of component B with respect to A + B
$C_2^-$ = ethylene $C_3^-$ = propylene Comparative Example 1 is example 1 of WO 03/046021, comparative example 2 is example 3 of WO 2006/114357.

The properties of these materials together with the properties of the compositions according to the invention are reported in table 2

TABLE 2

| Example | | 1 | 2 | Comp ex 1 | Comp ex 2 |
|---|---|---|---|---|---|
| MFR of the component A) | g/10' | 5.0 | 21.0 | 4.3 | 0.9 |
| $C_2^-$ | wt % | 4.6 | 4.7 | 3.8 | 1.10 |
| XS | % | 8.8 | 8.9 | 7.3 | 2.6 |
| % copolymer component B) | wt % | 20 | 16 | 20 | 16 |
| % $C_2^-$ component B) | wt % | 19 | 21 | 24 | 24 |
| MFR of the composition | g/10' | 4.5 | 18 | 7.5 | 1.3 |
| $C_2^-$ content | wt % | 7.4 | 7.4 | 8 | 4.80 |
| Xylene Solubles | % | 21.4 | 20 | 24.1 | 15.3 |
| XSIV | dl/g | 1.29 | 1.44 | 1.69 | 1.26 |
| Flexural Modulus | MPa | 614 | 617 | 490 | 1035 |
| Izod Impact 23° C. | kJ/m2 | 51.0 | 33.8 | 15.8 | 62.3 |
| Izod Impact 0° C. | kJ/m2 | 45.0 | 9.9 | — | 24.0 |
| Izod Impact −20° C. | kJ/m2 | 3.3 | 4.9 | 2.6 | 2.4 |
| D/B TT | ° C. | −15.4 | −15.0 | −25 | −5.8 |

TABLE 2-continued

| Example | | 1 | 2 | Comp ex 1 | Comp ex 2 |
|---|---|---|---|---|---|
| Haze (1 mm plaque) | % | 10.6 | 22 | 12.9* | 15.1 |
| GLOSS °60 | | 125.4 | 108.6 | 51* | — |
| DSC Tm | ° C. | 145.4 | 143.8 | 146.8 | — |
| DSC Tc | ° C. | 109.3 | 109.1 | 100.2 | — |
| DSC Hm | J/g | 74.1 | 69.4 | 67.2 | — |

*measured on 50 μm film
$C_2^-$ = ethylene

By comparing comparative example 1 with the examples of the present invention it can be seen that when the ethylene content in component B is out of the claimed range the Izod impact strength is lower. On the contrary when the ethylene content in the copolymer A is out of the claimed range the flexural modulus is higher and therefore the resulting copolymer is less soft.

The invention claimed is:

1. A propylene composition comprising (percent by weight):
   A) 60%-90%, of a crystalline propylene copolymer containing from 3.5% to 10.0% of ethylene derived units; and
   B) 10%-40%, of a copolymer of propylene containing from 18.5% to 23.5%, of ethylene derived units
   wherein the propylene composition has:
   (i) a haze lower than 25%, and
   (ii) at least one melt peak at a temperature ranging from 130 to 150° C., determined by differential scanning calorimetry.

2. The propylene composition according to claim 1, wherein component A) is a propylene copolymer containing from 3.5% to 9.0% by weight of ethylene derived units and component B) is a copolymer of propylene containing from 18.5% to 22% by weight of ethylene derived units.

3. The propylene composition according to claim 1, wherein the propylene composition has a melt flow rate ranging from 0.5 to 50 g/10 min, measured at 230° C. with a load of 2.16 kg.

4. The propylene composition according to claim 1, wherein the propylene composition has a flexural modulus is between 500 and 700 MPa.

5. The propylene composition according to claim 1, wherein the propylene composition has a haze lower than 23%.

6. The propylene composition according to claim 1, wherein the propylene composition has an Izod impact strength measured at 23° C. and the MFR according to the following relationship:
   MFR*Iz23>MFR*15+85;
   wherein Iz23 is the Izod impact strength measured at 23° C. and MFR is the Melt Flow Rate measured at 230° C. and with a load of 2.16 kg.

* * * * *